(12) United States Patent
Demir et al.

(10) Patent No.: US 7,336,744 B2
(45) Date of Patent: Feb. 26, 2008

(54) DIGITAL BASEBAND RECEIVER INCLUDING A CROSS-TALK COMPENSATION MODULE FOR SUPPRESSING INTERFERENCE BETWEEN REAL AND IMAGINARY SIGNAL COMPONENT PATHS

(75) Inventors: Alpaslan Demir, Commack, NY (US); Leonid Kazakevich, Plainview, NY (US); Tanbir Haque, Long Island City, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 697 days.

(21) Appl. No.: 10/757,633

(22) Filed: Jan. 14, 2004

(65) Prior Publication Data

US 2004/0264560 A1    Dec. 30, 2004

Related U.S. Application Data

(60) Provisional application No. 60/482,683, filed on Jun. 25, 2003.

(51) Int. Cl.
*H04L 1/00* (2006.01)
(52) U.S. Cl. .................. 375/346; 375/345; 375/222; 375/319; 375/317; 370/201
(58) Field of Classification Search ............... 375/322, 375/345, 346, 317, 319; 370/201
See application file for complete search history.

(56) References Cited

U.S. PATENT DOCUMENTS

| | | | | |
|---|---|---|---|---|
| 3,950,750 | A * | 4/1976 | Churchill et al. | 342/174 |
| 4,220,923 | A * | 9/1980 | Pelchat et al. | 455/295 |
| 5,705,949 | A * | 1/1998 | Alelyunas et al. | 329/304 |
| 5,872,538 | A * | 2/1999 | Fowler | 342/194 |
| 7,061,994 | B2 * | 6/2006 | Li et al. | 375/316 |
| 7,177,372 | B2 * | 2/2007 | Gu | 375/316 |
| 2002/0044014 | A1 * | 4/2002 | Wright et al. | 330/2 |
| 2005/0157813 | A1 * | 7/2005 | Cope et al. | 375/297 |

* cited by examiner

*Primary Examiner*—Chieh M. Fan
*Assistant Examiner*—Aris Fotakis
(74) *Attorney, Agent, or Firm*—Volpe and Koenig, P.C.

(57) ABSTRACT

A digital baseband (DBB) radio frequency (RF) receiver used for receiving and processing a wireless communication signal. The DBB RF receiver includes a demodulator, an analog to digital converter (ADC) and a digital cross-talk compensation module. The demodulator outputs analog real and imaginary signal components on real and imaginary signal paths, respectively, in response to receiving the communication signal. The ADC receives the analog real and imaginary signal components and outputs respective digital real and imaginary signal components. The digital cross-talk compensation module receives the digital real and imaginary signal components, estimates the cross-talk interference caused by each of the signal components, and outputs digital real and imaginary cross-talk compensated signal components.

39 Claims, 3 Drawing Sheets

DIGITAL BASEBAND RECEIVER INCLUDING A CROSS-TALK COMPENSATION MODULE FOR SUPPRESSING INTERFERENCE BETWEEN REAL AND IMAGINARY SIGNAL COMPONENT PATHS

CROSS REFERENCE TO RELATED APPLICATION

This application claims priority from U.S. Provisional Patent Application Ser. No. 60/482,683, filed Jun. 25, 2003, which is incorporated by reference as if fully set forth herein.

FIELD OF THE INVENTION

The present invention generally relates to receiver design in wireless communication systems. More particularly, the present invention relates to digital signal processing (DSP) techniques used to compensate for cross-talk interference introduced in an analog radio receiver.

BACKGROUND

Existing wireless system architectural configurations impose stringent constraints on the system designer with regards to receiving communication signals. Moreover, such configurations often provide low reliability communication links, high operating costs, and an undesirably low level of integration with other system components.

As shown in FIG. 1, an exemplary conventional radio frequency (RF) receiver 100 includes an analog radio receiver 105, at least one analog to digital converter (ADC) 110, a controller 115 and a modem 120. The analog radio receiver 105 is a direct conversion receiver which includes an antenna 125 for receiving a wireless communication signal, a bandpass filter 130, a low noise amplifier (LNA) 135, an optional second filter 140 (e.g., bandpass filter), at least one demodulator 145 forming real and imaginary signal paths 150, 155, respectively, a phase-locked loop (PLL) 160 and first and second analog low pass filters (LPFs) 165, 170, for controlling bandwidth selectivity. Alternatively, the analog radio receiver 105 may be a heterodyne receiver.

The modem 120 controls the switching of the LNA 135. The PLL 160 generates a local oscillator (LO) signal to control the real and imaginary signal paths 150, 155, formed by the demodulator 145. The real signal path 150 is an in-phase (I) signal path formed by the demodulator 145 for routing a real signal component of the wireless communication signal. The imaginary signal path 155 is a quadrature (Q) signal path formed by the demodulator 145 for routing an imaginary signal component of the wireless communication signal.

In the exemplary conventional RF receiver 100 of FIG. 1, the ADC 110 is connected to the real and imaginary signal paths 150, 155, via the analog LPFs 165, 170, respectively. An analog real signal component 175 is output from the LPF 165 to a real input port of the ADC 110 and an analog imaginary signal component 180 is output from LPF 170 to an imaginary input port of the ADC 110. Additional components, such as amplifiers and high pass filters (HPFs), may also be optionally coupled between the LPFs 165, 170, and the ADC 110. The ADC 110 outputs digital real and imaginary signal outputs 185, 190. The controller 115 maintains control over all of the active components of analog radio receiver 105 and the ADC 110.

In the analog radio receiver 105, the real and imaginary signal paths 150, 155, and the respective components to which they are coupled, are susceptible to cross-talk interference due to their capacitor-like structure. Thus, significant fringes detrimental to performance of the analog radio receiver 105 may occur between the real and imaginary signal paths 150, 155, including the components coupled thereto, due to their close proximity to one another. Cross-talk interference is the result of energy from the imaginary signal component being induced into the real signal path 150, and/or energy from the real signal component being induced into the imaginary signal path 155, which may cause coupling between the signal paths 150 and 155.

Because the costs of components that process RF analog signals are higher than the components that use DSP, it is desired to provide a digital baseband (DBB) system, including a low cost receiver with low noise and minimal power requirements, which utilizes DSP techniques to compensate for cross-talk interference which occurs between the real and imaginary signal components.

SUMMARY

The present invention is a DBB RF receiver used for receiving and processing a wireless communication signal. The DBB receiver includes at least one demodulator, an analog to digital converter (ADC) and a digital cross-talk compensation module. The demodulator outputs analog real and imaginary signal components on real and imaginary signal paths, respectively, in response to receiving the communication signal. The ADC receives the analog real and imaginary signal components and outputs respective digital real and imaginary signal components. The digital cross-talk compensation module receives the digital real and imaginary signal components, estimates the cross-talk interference caused by each of the signal components, and outputs digital real and imaginary cross-talk compensated signal components.

The present invention may be incorporated into a DBB RF receiver, a wireless transmit/receive unit (WTRU), an integrated circuit (IC), a wireless communication system and method, or any other desired communication mechanism.

The digital cross-talk compensation module may include a real signal path for receiving the digital real signal component and an imaginary signal path for receiving the digital imaginary signal component. Furthermore, the digital cross-talk compensation module may include first and second delay units and first and second adders. The first delay unit may be inserted in the real signal path to receive the digital real signal component and output the digital real signal component after a first predetermined delay period expires. The second delay unit may be inserted in the imaginary signal path to receive the digital imaginary signal component and output the digital imaginary signal component after a second predetermined delay period expires. The first adder may add a real cross-talk compensation signal to the delayed digital real signal component output by the first delay unit. The second adder may add an imaginary cross-talk compensation signal to the delayed digital imaginary signal component output by the second delay unit.

The DBB RF receiver may further include a controller in communication with the ADC and the digital cross-talk compensation module.

The digital cross-talk compensation module may further include a third delay unit coupled to the real signal path, a third adder coupled to the real signal path and to the third delay unit, and a first multiplier coupled to the third adder. The third delay unit may receive the digital real signal component and output the digital real signal component after a predetermined delay period expires. The third adder may add a negative value of the digital real signal component to the delayed digital real signal component output by the third delay unit to generate a first resulting signal. The first multiplier may multiply the first resulting signal with a first compensation signal having a predetermined value ($K_1$) to generate a second resulting signal used for adjusting the digital real signal component to compensate for distortion due to the occurrence of cross-talk between the analog real and imaginary signal components.

The digital cross-talk compensation module may further include a fourth delay unit coupled to the imaginary signal path, a fourth adder coupled to the imaginary signal path and to the fourth delay unit, and a second multiplier coupled to the fourth adder. The fourth delay unit may receive the digital imaginary signal component and output the digital imaginary signal component after a predetermined delay period expires. The fourth adder may add a negative value of the digital imaginary signal component to the delayed digital imaginary signal component output by the fourth delay unit to generate a third resulting signal. The second multiplier may multiply the third resulting signal with a second compensation signal having a predetermined value ($K_2$) to generate a fourth resulting signal used for adjusting the digital imaginary signal component to compensate for distortion due to the occurrence of cross-talk between the analog real and imaginary signal components.

BRIEF DESCRIPTION OF THE DRAWING(S)

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Figure 1:
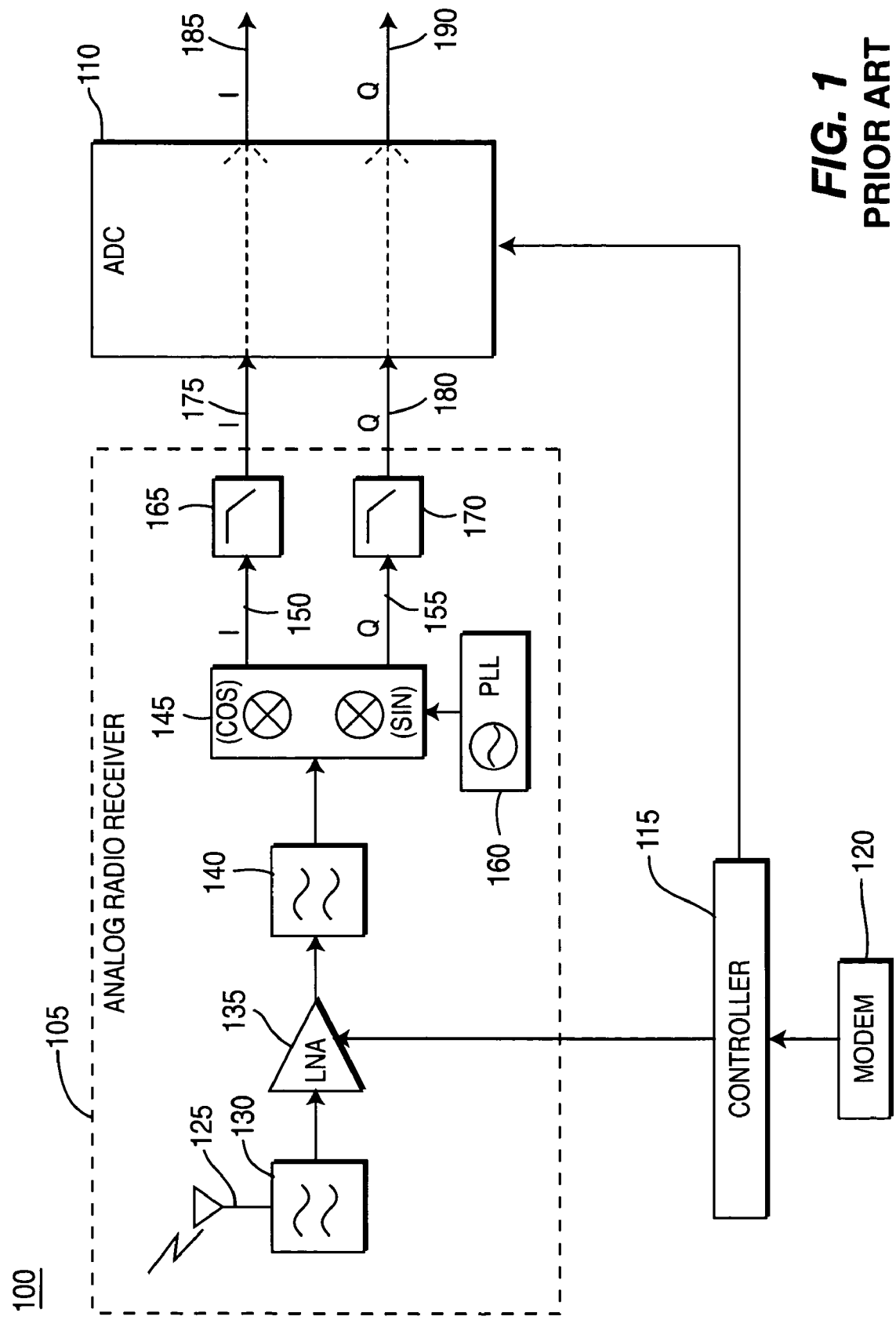
FIG. 1 is an exemplary block diagram of a conventional RF receiver including an analog radio receiver.
Figure 2:
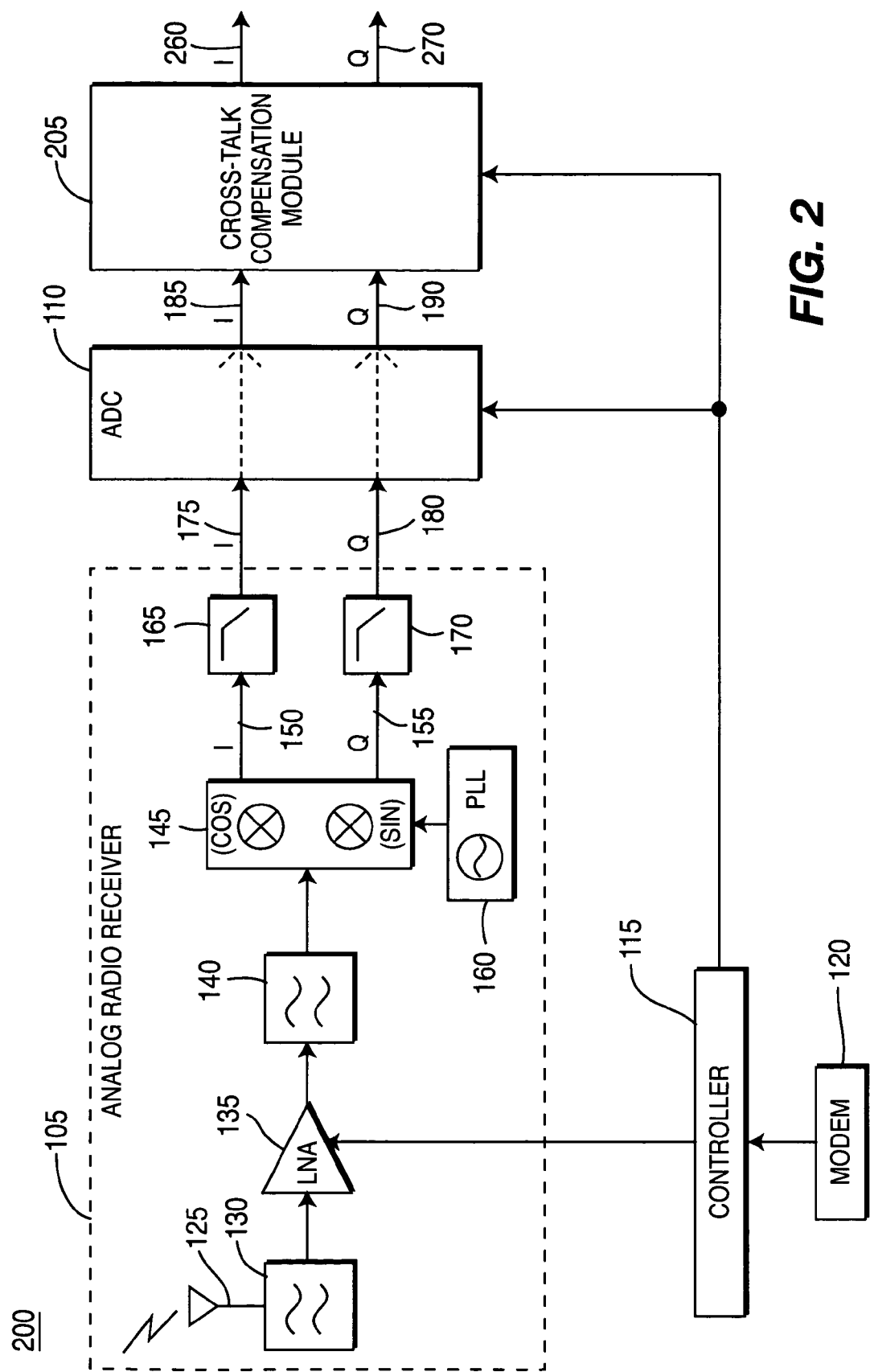
FIG. 2 is an exemplary block diagram of a DBB RF receiver configured in accordance with a preferred embodiment of the present invention.

FIG. 2 is a block diagram of a DBB RF receiver 200, configured in accordance with a preferred embodiment of the present invention. Although the invention will be referred to in terms of being implemented upon a receiver 200, it should also be understood by those of skill in the art that the invention pertains equally to a transceiver.

Preferably, the method and system disclosed herein is incorporated into a wireless transmit/receive unit (WTRU). Hereafter, a WTRU includes but is not limited to a user equipment, mobile station, fixed or mobile subscriber unit, pager, or any other type of device capable of operating in a wireless environment. The features of the present invention may be incorporated into an integrated circuit (IC) or be configured in a circuit comprising a multitude of interconnecting components.

The present invention is applicable to communication systems using time division duplex (TDD), time division multiple access (TDMA), frequency division duplex (FDD), code division multiple access (CDMA), CDMA 2000, time division synchronous CDMA (TDSCDMA), and orthogonal frequency division multiplexing (OFDM). However, the present invention is envisaged to be applicable to other types of communication systems as well.

As shown in FIG. 2, the DBB RF receiver 200 includes the analog radio receiver 105 and a digital cross-talk compensation module 205. The digital cross-talk compensation module 205 has real and imaginary signal paths respectively connected to the digital real and imaginary signal outputs 185, 190, of the ADC 110. The digital cross-talk compensation module 205 further includes real and imaginary compensated signal outputs 260, 270. The digital cross-talk compensation module 205 and the ADC 110 may be controlled by the controller 115.

Figure 3:
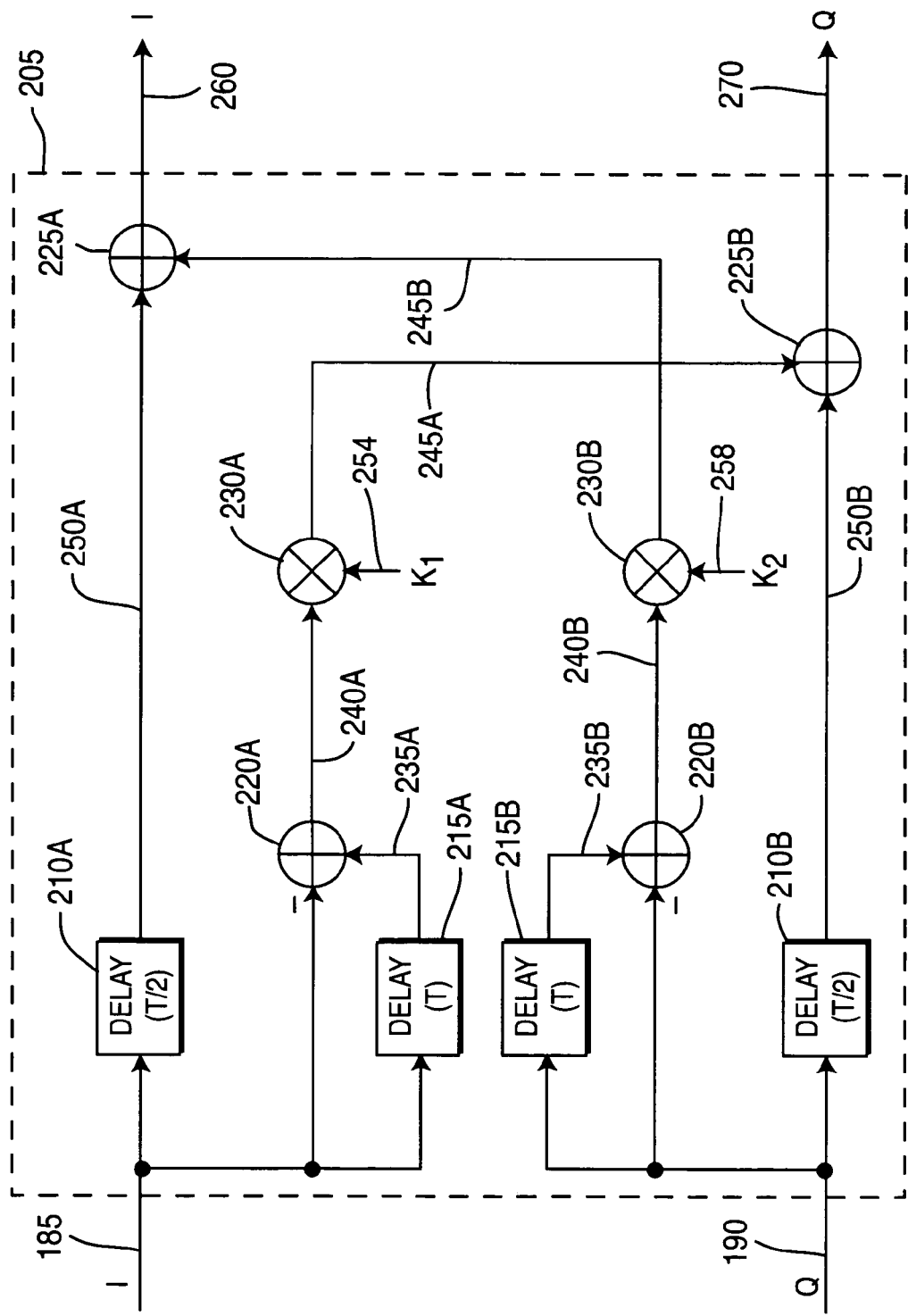
FIG. 3 shows an exemplary configuration of the digital cross-talk compensation module in the DBB RF receiver of FIG. 2.

FIG. 3 shows an exemplary configuration of the digital cross-talk compensation module 205 in the DBB RF receiver 200. The digital cross-talk compensation module 205 includes delay units 210A, 210B, 215A, 215B, adders 220A, 220B, 225A, 225B, and multipliers 230A, 230B. The adders 225A, 225B, add real and imaginary cross-talk compensation signals 245A, 245B to the real and imaginary signal components, respectively, after the real and imaginary signal components are delayed for a period T/2, via delay units 210A, 210B, in order to provide real and imaginary compensated outputs 260, 270.

The digital cross-talk compensation module 205 provides a response that estimates the interference by the real signal component on the imaginary signal component, and then subtracts the real interference estimate from the imaginary signal component. The real signal component is delayed by a period T, via delay unit 215A, to generate a T-delayed real signal component 235A. The adder 220A adds a negative value of the real signal component to the T-delayed real signal component 235A to generate a resulting signal 240A. The real cross-talk compensation signal 245A is generated in response to multiplying the resulting signal 240A by a first compensation signal 254 having a value $K_1$, via the multiplier 230A.

Furthermore, the digital cross-talk compensation module 205 provides a response that estimates the interference caused by the imaginary signal component on the real signal component, and then subtracts the imaginary interference estimate from the real signal component. The imaginary signal component is delayed by a period T, via delay unit 215B, to generate a T-delayed imaginary signal component 235B. The adder 220B adds a negative value of the imaginary signal component to the T-delayed imaginary signal component 235B to generate a resulting signal 240B. The imaginary cross-talk compensation signal 245B is generated in response to multiplying the resulting signal 240B by a second compensation signal 258 having a value $K_2$, via the multiplier 230B.

The parameters T, $K_1$ and $K_2$ are fixed after performing a calibration routine during which the parameters T, $K_1$ and $K_2$ are adjusted to define the cutoff frequency and gain characteristics of the real and imaginary signal components. Calibration of the digital cross-talk compensation module 205 may be implemented by performing interference estimates on the real and imaginary signal components while measuring the error between ideal and actual signal component frequency and gain characteristics. The present invention may use a multitude of methods to measure the error between the ideal signal components and the respective actual signal components, including using error vector magnitude (EVM) prior to hardware usage.

In summary, the present invention is a DBB receiver 200 for receiving and processing a wireless communication signal. The DBB receiver 200 includes at least one demodulator 145, an ADC 110, a digital cross-talk compensation module 205 and a controller 115.

The demodulator 145 outputs analog real and imaginary signal components on real and imaginary signal paths 150, 155, respectively, in response to receiving the communication signal. The ADC 110 is coupled to the real and imaginary signal paths 150, 155, for receiving the analog real and imaginary signal components 150, 155, and outputting respective digital real and imaginary signal components. The digital cross-talk compensation module 205 is in communication with the ADC 110. The digital cross-talk compensation module 205 receives the digital real and imaginary signal components, estimates the cross-talk interference caused by each of the signal components, and outputs digital real and imaginary cross-talk compensated signal components. The controller 115 is in communication with the ADC 110 and the digital cross-talk compensation module 205.

The digital cross-talk compensation module 205 includes a real signal path 185 for receiving the digital real signal component, and an imaginary signal path 190 for receiving the digital imaginary signal component. Furthermore, the digital cross-talk compensation module 205 includes delay units 210A, 210B, and adders 225A, 225B.

The delay unit 210A is inserted in the real signal path for receiving the digital real signal component and outputting the digital real signal component after a first predetermined delay period (T/2) expires. The delay unit 210B is inserted in the imaginary signal path for receiving the digital imaginary signal component and outputting the digital imaginary signal component after a second predetermined delay period (T/2) expires.

The adder 225A is for adding a real cross-talk compensation signal to the delayed digital real signal component output by the delay unit 210A. The adder 225B is used to add an imaginary cross-talk compensation signal to the delayed digital imaginary signal component output by the delay unit 210B.

The digital cross-talk compensation module 205 also includes a delay unit 215A, an adder 220A and a multiplier 230A. The delay unit 215A is coupled to the real signal path 185 for receiving the digital real signal component and outputting the digital real signal component after a predetermined delay period (T) expires. The adder 220A is coupled to the real signal path 185 and to the delay unit 215A. The adder 220A is used to add a negative value of the digital real signal component to the delayed digital real signal component 235A output by the delay unit 215A to generate a first resulting signal 240A. The multiplier 230A is coupled to the adder 220A for multiplying the first resulting signal 240A with a compensation signal 254 having a predetermined value ($K_1$) to generate a second resulting signal 245A used for adjusting the digital real signal component to compensate for distortion due to the occurrence of cross-talk between the analog real and imaginary signal components 150, 155.

The digital cross-talk compensation module 205 also includes a delay unit 215B, an adder 220B and a multiplier 230B. The delay unit 215B is coupled to the imaginary signal path 190 for receiving the digital imaginary signal component and outputting the digital imaginary signal component after a predetermined delay period (T) expires. The adder 220B is coupled to the imaginary signal path 190 and to the delay unit 215B. The adder 220B is used to add a negative value of the digital imaginary signal component to the delayed digital real signal component 235B output by the delay unit 215B to generate a first resulting signal 240B. The multiplier 230B is coupled to the adder 220B for multiplying the first resulting signal 240B with a compensation signal 258 having a predetermined value ($K_2$) to generate a second resulting signal 245B used for adjusting the digital imaginary signal component to compensate for distortion due to the occurrence of cross-talk between the analog real and imaginary signal components 150, 155.

It should be understood that the compensation of the real and imaginary signal components may be implemented by the digital cross-talk compensation module 205 at a sample rate substantially higher than the chip rate (e.g., ten times the chip rate).

While this invention has been particularly shown and described with reference to preferred embodiments, it will be understood by those skilled in the art that various changes in form and details may be made therein without departing from the scope of the invention described hereinabove.

What is claimed is:

1. A digital baseband (DBB) receiver for receiving and processing a wireless communication signal, the DBB receiver comprising:
   (a) at least one demodulator which outputs analog real and imaginary signal components on real and imaginary signal paths, respectively, in response to receiving the communication signal;
   (b) an analog to digital converter (ADC) coupled to the real and imaginary signal paths for receiving the analog real and imaginary signal components and outputting respective digital real and imaginary signal components; and
   (c) a digital cross-talk compensation module in communication with the ADC, wherein the digital cross-talk compensation module receives the digital real and imaginary signal components, estimates cross-talk interference on the real signal component resulting from energy from the imaginary signal component being induced into the real signal path, estimates cross-talk interference on the imaginary signal component resulting from energy from the real signal component being induced into the imaginary signal path, and outputs digital real and imaginary cross-talk compensated signal components, wherein the digital cross-talk compensation module comprises:
      (i) a real signal path for receiving the digital real signal component;
      (ii) an imaginary signal path for receiving the digital imaginary signal component;
      (iii) a first delay unit, coupled to the real signal path, for receiving the digital real signal component and outputting the digital real signal component after a first predetermined delay period expires;
      (iv) a first adder, coupled to the real signal path and the first delay unit, for adding a negative value of the digital real signal component to the delayed digital real signal component output by the first delay unit to generate a first resulting signal;
      (v) a first multiplier, coupled to the first adder, for multiplying the first resulting signal with a first compensation signal having a first predetermined value ($K_1$) to generate a second resulting signal;
      (vi) a second delay unit, coupled to the imaginary signal path, for receiving the digital imaginary signal component and outputting the digital imaginary signal component after a second predetermined delay period expires; and (vii) a second adder, coupled to the second delay unit and the first multiplier, for outputting the digital imaginary cross-talk compensated signal component.

2. The DBB receiver of claim 1 further comprising:
(d) a controller in communication with the ADC and the digital cross-talk compensation module.

3. The DBB receiver of claim 1 wherein the digital cross-talk compensation module further comprises:
(viii) a third delay unit, coupled to the imaginary signal path, for receiving the digital imaginary signal component and outputting the digital imaginary signal component after a third predetermined delay period expires;
(ix) a third adder, coupled to the imaginary signal path and the third delay unit, for adding a negative value of the digital imaginary signal component to the delayed digital imaginary signal component output by the third delay unit to generate a third resulting signal;
(x) a second multiplier, coupled to the first adder, for multiplying the third resulting signal with a second compensation signal having a second predetermined value ($K_2$) to generate a fourth resulting signal;
(xi) a fourth delay unit, coupled to the real signal path, for receiving the digital real signal component and outputting the digital real signal component after a fourth predetermined delay period expires; and
(xii) a fourth adder, coupled to the fourth delay unit and the second multiplier, for outputting the digital real cross-talk compensated signal component.

4. The DBB receiver of claim 1 wherein the first predetermined delay period is larger than the second predetermined delay period.

5. The DBB receiver of claim 3 wherein the third predetermined delay period is larger than the fourth predetermined delay period.

6. The DBB receiver of claim 3 wherein the first and third predetermined delay periods are the same.

7. The DBB receiver of claim 3 wherein the second and fourth predetermined delay periods are the same.

8. A wireless transmit/receive unit (WTRU) for receiving and processing a wireless communication signal, the WTRU comprising:
(a) a demodulator which outputs analog real and imaginary signal components on real and imaginary signal paths, respectively, in response to receiving the communication signal;
(b) an analog to digital converter (ADC) coupled to the real and imaginary signal paths for receiving the analog real and imaginary signal components and outputting respective digital real and imaginary signal components; and
(c) a digital cross-talk compensation module in communication with the ADC, wherein the digital cross-talk compensation module receives the digital real and imaginary signal components, estimates cross-talk interference on the real signal component resulting from energy from the imaginary signal component being induced into the real signal path, estimates cross-talk interference on the imaginary signal component resulting from energy from the real signal component being induced into the imaginary signal path, and outputs digital real and imaginary cross-talk compensated signal components, wherein the digital cross-talk compensation module comprises:

(i) a real signal path for receiving the digital real signal component;
(ii) an imaginary signal path for receiving the digital imaginary signal component;
(iii) a first delay unit, coupled to the real signal path, for receiving the digital real signal component and outputting the digital real signal component after a first predetermined delay period expires;
(iv) a first adder, coupled to the real signal path and the first delay unit, for adding a negative value of the digital real signal component to the delayed digital real signal component output by the first delay unit to generate a first resulting signal;
(v) a first multiplier, coupled to the first adder, for multiplying the first resulting signal with a first compensation signal having a first predetermined value ($K_1$) to generate a second resulting signal;
(vi) a second delay unit, coupled to the imaginary signal path, for receiving the digital imaginary signal component and outputting the digital imaginary signal component after a second predetermined delay period expires; and
(vii) a second adder, coupled to the second delay unit and the first multiplier, for outputting the digital imaginary cross-talk compensated signal component.

9. The WTRU of claim 8 further comprising:
(d) a controller in communication with the ADC and the digital cross-talk compensation module.

10. The WTRU of claim 8 wherein the digital cross-talk compensation module further comprises:
(viii) a third delay unit, coupled to the imaginary signal path, for receiving the digital imaginary signal component and outputting the digital imaginary signal component after a third predetermined delay period expires;
(ix) a third adder, coupled to the imaginary signal path and the third delay unit, for adding a negative value of the digital imaginary signal component to the delayed digital imaginary signal component output by the third delay unit to generate a third resulting signal;
(x) a second multiplier, coupled to the first adder, for multiplying the third resulting signal with a second compensation signal having a second predetermined value ($K_2$) to generate a fourth resulting signal;
(xi) a fourth delay unit, coupled to the real signal path, for receiving the digital real signal component and outputting the digital real signal component after a fourth predetermined delay period expires; and
(xii) a fourth adder, coupled to the fourth delay unit and the second multiplier, for outputting the digital real cross-talk compensated signal component.

11. The WTRU of claim 8 wherein the first predetermined delay period is larger than the second predetermined delay period.

12. The WTRU of claim 10 wherein the third predetermined delay period is larger than the fourth predetermined delay period.

13. The WTRU of claim 10 wherein the first and third predetermined delay periods are the same.

14. The WTRU of claim 10 wherein the second and fourth predetermined delay periods are the same.

15. An integrated circuit (IC) for receiving and processing a wireless communication signal, the IC comprising:
(a) a demodulator which outputs analog real and imaginary signal components on real and imaginary signal paths, respectively, in response to receiving the communication signal;

(b) an analog to digital converter (ADC) coupled to the real and imaginary signal paths for receiving the analog real and imaginary signal components and outputting respective digital real and imaginary signal components; and (c) a digital cross-talk compensation module in communication with the ADC, wherein the digital cross-talk compensation module receives the digital real and imaginary signal components, estimates cross-talk interference on the real signal component resulting from energy from the imaginary signal component being induced into the real signal path, estimates cross-talk interference on the imaginary signal component resulting from energy from the real signal component being induced into the imaginary signal path, and outputs digital real and imaginary cross-talk compensated signal components, wherein the digital cross-talk compensation module comprises:

(i) a real signal path for receiving the digital real signal component;

(ii) an imaginary signal path for receiving the digital imaginary signal component;

(iii) a first delay unit, coupled to the real signal path, for receiving the digital real signal component and outputting the digital real signal component after a first predetermined delay period expires;

(iv) a first adder, coupled to the real signal path and the first delay unit, for adding a negative value of the digital real signal component to the delayed digital real signal component output by the first delay unit to generate a first resulting signal;

(v) a first multiplier, coupled to the first adder, for multiplying the first resulting signal with a first compensation signal having a first predetermined value ($K_1$) to generate a second resulting signal;

(vi) a second delay unit, coupled to the imaginary signal path, for receiving the digital imaginary signal component and outputting the digital imaginary signal component after a second predetermined delay period expires; and (vii) a second adder, coupled to the second delay unit and the first multiplier, for outputting the digital imaginary cross-talk compensated signal component.

16. The IC of claim 15 further comprising:

(d) a controller in communication with the ADC and the digital cross-talk compensation module.

17. The IC of claim 15 wherein the digital cross-talk compensation module further comprises:

(viii) a third delay unit, coupled to the imaginary signal path, for receiving the digital imaginary signal component and outputting the digital imaginary signal component after a third predetermined delay period expires;

(ix) a third adder, coupled to the imaginary signal path and the third delay unit, for adding a negative value of the digital imaginary signal component to the delayed digital imaginary signal component output by the third delay unit to generate a third resulting signal;

(x) a second multiplier, coupled to the first adder, for multiplying the third resulting signal with a second compensation signal having a second predetermined value ($K_2$) to generate a fourth resulting signal;

(xi) a fourth delay unit, coupled to the real signal path, for receiving the digital real signal component and outputting the digital real signal component after a fourth predetermined delay period expires; and (xii) a fourth adder, coupled to the fourth delay unit and the second multiplier, for outputting the digital real cross-talk compensated signal component.

18. The IC of claim 15 wherein the first predetermined delay period is larger than the second predetermined delay period.

19. The IC of claim 17 wherein the third predetermined delay period is larger than the fourth predetermined delay period.

20. The IC of claim 17 wherein the first and third predetermined delay periods are the same.

21. The IC of claim 17 wherein the second and fourth predetermined delay periods are the same.

22. A digital baseband (DBB) receiver for receiving and processing a wireless communication signal, the DBB receiver comprising:

(a) at least one demodulator which outputs analog real and imaginary signal components on real and imaginary signal paths, respectively, in response to receiving the communication signal;

(b) an analog to digital converter (ADC) coupled to the real and imaginary signal paths for receiving the analog real and imaginary signal components and outputting respective digital real and imaginary signal components; and (c) a digital cross-talk compensation module in communication with the ADC, wherein the digital cross-talk compensation module receives the digital real and imaginary signal components, estimates cross-talk interference on the real signal component resulting from energy from the imaginary signal component being induced into the real signal path, estimates cross-talk interference on the imaginary signal component resulting from energy from the real signal component being induced into the imaginary signal path, and outputs digital real and imaginary cross-talk compensated signal components, wherein the digital cross-talk compensation module comprises:

(i) a real signal path for receiving the digital real signal component;

(ii) an imaginary signal path for receiving the digital imaginary signal component;

(iii) a first delay unit, coupled to the imaginary signal path, for receiving the digital imaginary signal component and outputting the digital imaginary signal component after a first predetermined delay period expires;

(iii) a first adder, coupled to the imaginary signal path and the first delay unit, for adding a negative value of the digital imaginary signal component to the delayed digital imaginary signal component output by the first delay unit to generate a first resulting signal;

(iv) a first multiplier, coupled to the first adder, for multiplying the first resulting signal with a first compensation signal having a first predetermined value ($K_2$) to generate a second resulting signal;

(v) a second delay unit, coupled to the real signal path, for receiving the digital real signal component and outputting the digital real signal component after a second predetermined delay period expires; and (vi) a second adder, coupled to the second delay unit and the first multiplier, for outputting the digital real cross-talk compensated signal component.

23. The DBB receiver of claim 22 wherein the digital cross-talk compensation module further comprises:

(vii) a third delay unit, coupled to the real signal path, for receiving the digital real signal component and outputting the digital real signal component after a third predetermined delay period expires;

(viii) a third adder, coupled to the real signal path and the third delay unit, for adding a negative value of the digital real signal component to the delayed digital real signal component output by the third delay unit to generate a third resulting signal;

(ix) a second multiplier, coupled to the third adder, for multiplying the third resulting signal with a second compensation signal having a second predetermined value ($K_1$) to generate a fourth resulting signal;

(x) a fourth delay unit, coupled to the imaginary signal path, for receiving the digital imaginary signal component and outputting the digital imaginary signal component after a fourth predetermined delay period expires; and (xi) a fourth adder, coupled to the fourth delay unit and the second multiplier, for outputting the digital imaginary cross-talk compensated signal component.

24. The DBB receiver of claim 22 wherein the first predetermined delay period is larger than the second predetermined delay period.

25. The DBB receiver of claim 23 wherein the third predetermined delay period is larger than the fourth predetermined delay period.

26. The DBB receiver of claim 23 wherein the first and third predetermined delay periods are the same.

27. The DBB receiver of claim 23 wherein the second and fourth predetermined delay periods are the same.

28. A wireless transmit/receive unit (WTRU) for receiving and processing a wireless communication signal, the WTRU comprising:

(a) at least one demodulator which outputs analog real and imaginary signal components on real and imaginary signal paths, respectively, in response to receiving the communication signal;

(b) an analog to digital converter (ADC) coupled to the real and imaginary signal paths for receiving the analog real and imaginary signal components and outputting respective digital real and imaginary signal components; and (c) a digital cross-talk compensation module in communication with the ADC, wherein the digital cross-talk compensation module receives the digital real and imaginary signal components, estimates cross-talk interference on the real signal component resulting from energy from the imaginary signal component being induced into the real signal path, estimates cross-talk interference on the imaginary signal component resulting from energy from the real signal component being induced into the imaginary signal path, and outputs digital real and imaginary cross-talk compensated signal components, wherein the digital cross-talk compensation module comprises:

(i) a real signal path for receiving the digital real signal component;

(ii) an imaginary signal path for receiving the digital imaginary signal component;

(iii) a first delay unit, coupled to the imaginary signal path, for receiving the digital imaginary signal component and outputting the digital imaginary signal component after a first predetermined delay period expires;

(iii) a first adder, coupled to the imaginary signal path and the first delay unit, for adding a negative value of the digital imaginary signal component to the delayed digital imaginary signal component output by the first delay unit to generate a first resulting signal;

(iv) a first multiplier, coupled to the first adder, for multiplying the first resulting signal with a first compensation signal having a first predetermined value ($K_2$) to generate a second resulting signal;

(v) a second delay unit, coupled to the real signal path, for receiving the digital real signal component and outputting the digital real signal component after a second predetermined delay period expires; and (vi) a second adder, coupled to the second delay unit and the first multiplier, for outputting the digital real cross-talk compensated signal component.

29. The WTRU of claim 28 wherein the digital cross-talk compensation module further comprises:

(vii) a third delay unit, coupled to the real signal path, for receiving the digital real signal component and outputting the digital real signal component after a third predetermined delay period expires;

(viii) a third adder, coupled to the real signal path and the third delay unit, for adding a negative value of the digital real signal component to the delayed digital real signal component output by the third delay unit to generate a third resulting signal;

(ix) a second multiplier, coupled to the third adder, for multiplying the third resulting signal with a second compensation signal having a second predetermined value ($K_1$) to generate a fourth resulting signal;

(x) a fourth delay unit, coupled to the imaginary signal path, for receiving the digital imaginary signal component and outputting the digital imaginary signal component after a fourth predetermined delay period expires; and (xi) a fourth adder, coupled to the fourth delay unit and the second multiplier, for outputting the digital imaginary cross-talk compensated signal component.

30. The WTRU of claim 28 wherein the first predetermined delay period is larger than the second predetermined delay period.

31. The WTRU of claim 29 wherein the third predetermined delay period is larger than the fourth predetermined delay period.

32. The WTRU of claim 29 wherein the first and third predetermined delay periods are the same.

33. The WTRU of claim 29 wherein the second and fourth predetermined delay periods are the same.

34. An integrated circuit (IC) for receiving and processing a wireless communication signal, the IC comprising:

(a) at least one demodulator which outputs analog real and imaginary signal components on real and imaginary signal paths, respectively, in response to receiving the communication signal;

(b) an analog to digital converter (ADC) coupled to the real and imaginary signal paths for receiving the analog real and imaginary signal components and outputting respective digital real and imaginary signal components; and (c) a digital cross-talk compensation module in communication with the ADC, wherein the digital cross-talk compensation module receives the digital real and imaginary signal components, estimates cross-talk interference on the real signal component resulting from energy from the imaginary signal component being induced into the real signal path, estimates cross-talk interference on the imaginary signal component resulting from energy from the real signal component being induced into the imaginary signal path, and outputs digital real and imaginary cross-talk compensated signal components, wherein the digital cross-talk compensation module comprises:
(i) a real signal path for receiving the digital real signal component;
(ii) an imaginary signal path for receiving the digital imaginary signal component;
(iii) a first delay unit, coupled to the imaginary signal path, for receiving the digital imaginary signal component and outputting the digital imaginary signal component after a first predetermined delay period expires;
(iii) a first adder, coupled to the imaginary signal path and the first delay unit, for adding a negative value of the digital imaginary signal component to the delayed digital imaginary signal component output by the first delay unit to generate a first resulting signal;
(iv) a first multiplier, coupled to the first adder, for multiplying the first resulting signal with a first compensation signal having a first predetermined value ($K_2$) to generate a second resulting signal;
(v) a second delay unit, coupled to the real signal path, for receiving the digital real signal component and outputting the digital real signal component after a second predetermined delay period expires; and
(vi) a second adder, coupled to the second delay unit and the first multiplier, for outputting the digital real cross-talk compensated signal component.

35. The IC of claim 34 wherein the digital cross-talk compensation module further comprises:
(vii) a third delay unit, coupled to the real signal path, for receiving the digital real signal component and outputting the digital real signal component after a third predetermined delay period expires;
(viii) a third adder, coupled to the real signal path and the third delay unit, for adding a negative value of the digital real signal component to the delayed digital real signal component output by the third delay unit to generate a third resulting signal;
(ix) a second multiplier, coupled to the third adder, for multiplying the third resulting signal with a second compensation signal having a second predetermined value ($K_1$) to generate a fourth resulting signal;
(x) a fourth delay unit, coupled to the imaginary signal path, for receiving the digital imaginary signal component and outputting the digital imaginary signal component after a fourth predetermined delay period expires; and
(xi) a fourth adder, coupled to the fourth delay unit and the second multiplier, for outputting the digital imaginary cross-talk compensated signal component.

36. The IC of claim 34 wherein the first predetermined delay period is larger than the second predetermined delay period.

37. The IC of claim 35 wherein the third predetermined delay period is larger than the fourth predetermined delay period.

38. The IC of claim 35 wherein the first and third predetermined delay periods are the same.

39. The IC of claim 35 wherein the second and fourth predetermined delay periods are the same.

* * * * *